United States Patent
Inaba

(10) Patent No.: US 7,768,445 B2
(45) Date of Patent: Aug. 3, 2010

(54) FREQUENCY-MODULATED RADAR SYSTEM WITH VARIABLE PULSE INTERVAL CAPABILITY

(75) Inventor: Takayuki Inaba, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 838 days.

(21) Appl. No.: 11/658,996

(22) PCT Filed: Aug. 2, 2004

(86) PCT No.: PCT/JP2004/011056

§ 371 (c)(1),
(2), (4) Date: Jan. 31, 2007

(87) PCT Pub. No.: WO2006/013615

PCT Pub. Date: Feb. 9, 2006

(65) Prior Publication Data

US 2009/0278727 A1 Nov. 12, 2009

(51) Int. Cl.
*G01S 13/34* (2006.01)
(52) U.S. Cl. .................................. 342/112
(58) Field of Classification Search ............... 342/112, 342/109, 104, 70
See application file for complete search history.

(56) References Cited

U.S. PATENT DOCUMENTS

| 5,227,784 | A | 7/1993 | Masamori et al. |
| 5,274,380 | A | 12/1993 | Yatsuka et al. |
| 5,497,162 | A | 3/1996 | Kaiser |
| 5,923,280 | A | 7/1999 | Farmer |
| 6,028,548 | A | 2/2000 | Farmer |
| 6,317,467 | B1 | 11/2001 | Cox et al. |
| 7,528,768 | B2 * | 5/2009 | Wakayama et al. .......... 342/196 |
| 7,561,099 | B2 * | 7/2009 | Wakayama et al. ............ 342/85 |
| 7,586,436 | B2 * | 9/2009 | Wakayama et al. .......... 342/107 |
| 2004/0056793 | A1 | 3/2004 | Matsubara et al. |
| 2005/0179582 | A1 | 8/2005 | Woodington et al. |

(Continued)

FOREIGN PATENT DOCUMENTS

EP  1666914 A1 *  6/2006

(Continued)

OTHER PUBLICATIONS

Machine translation of JP2004109046.*

(Continued)

*Primary Examiner*—Dan Pihulic
(74) *Attorney, Agent, or Firm*—Birch, Stewart, Kolasch & Birch, LLP

(57) ABSTRACT

A radar system utilizing a CW radar system, including an FMCW radar, is capable of avoiding interference wave generation and of simultaneously covering a number of radar systems within limited frequency modulation bands. The radar system 1 for emitting into space transmission radio waves based on a frequency-modulated continuous wave reference, and receiving transmission radio waves reflected from an external object, as well as for obtaining beat signals, from the received signals and the continuous wave reference, and computing from the beat signals obtained, a distance to and a velocity of the external object, comprises a pulse generation means 13 for pulsing the continuous-wave reference at an interval unique to the radar system, and an antenna 16 for emitting into space, the pulse transmit signals as the transmission radio waves.

12 Claims, 9 Drawing Sheets

U.S. PATENT DOCUMENTS

| | | |
|---|---|---|
| 2006/0238405 A1* | 10/2006 | Wakayama et al. ............ 342/70 |
| 2008/0042895 A1* | 2/2008 | Inaba ......................... 342/112 |
| 2008/0165049 A1* | 7/2008 | Wakayama et al. ......... 342/118 |
| 2008/0309546 A1* | 12/2008 | Wakayama et al. .......... 342/129 |
| 2009/0009381 A1* | 1/2009 | Inaba ......................... 342/109 |
| 2009/0207068 A1* | 8/2009 | Inaba ......................... 342/70 |
| 2009/0278727 A1* | 11/2009 | Inaba ......................... 342/112 |

FOREIGN PATENT DOCUMENTS

| | | | |
|---|---|---|---|
| EP | 1775600 A1 * | 4/2007 | |
| EP | 1777548 A1 * | 4/2007 | |
| EP | 1847848 A1 * | 10/2007 | |
| GB | 2 024 557 A | 1/1980 | |
| JP | 4-236388 A | 8/1992 | |
| JP | 5-240947 A | 9/1993 | |
| JP | 5-264727 A | 10/1993 | |
| JP | 6-138217 A | 5/1994 | |
| JP | 10-512370 A | 11/1998 | |
| JP | 2001-51049 A | 2/2001 | |
| JP | 2001-74830 A | 3/2001 | |
| JP | 2002-513468 A | 5/2002 | |
| JP | 2004-109046 A | 4/2004 | |
| JP | 2004-170183 A | 6/2004 | |
| WO | WO 2005026769 A1 * | 3/2005 | |
| WO | WO 2006013614 A1 * | 2/2006 | |
| WO | WO 2006013615 A1 * | 2/2006 | |
| WO | WO 2007015288 A1 * | 2/2007 | |

OTHER PUBLICATIONS

Kajiwara, IEICE B-11, vol. J-81-B-11, No. 3, pp. 234-239, May 1998.

Fujimoto et al., Technical Report of IEICE, SST99-106, pp. 69-76, Feb. 2000.

* cited by examiner

FREQUENCY-MODULATED RADAR SYSTEM WITH VARIABLE PULSE INTERVAL CAPABILITY

TECHNICAL FIELD

The present invention relates to radar technologies for detecting an external object's location and velocity by emitting in space, frequency-modulated continuous waves, and more particularly to those of permitting a plurality of radar systems to coexist, and avoiding each interference between the radio transmission waves.

BACKGROUND ART

In order to increase safety of vehicles, an auto-cruising control system, or a driver's assistance system is under study. Aiming at supplementing a driver's sensory perception of road conditions, these systems are often equipped with a radar system observing circumstances surrounding vehicles. As these automotive radar systems, various radar systems such as a pulse radar, a pulse-compression radar (a spread spectrum radar), an FMCW (frequency modulated continuous wave) radar, and two-frequency CW (continuous wave) radar have thus far been proposed.

As represented by meteorological radars and defense radars, up to now, radar systems have in many cases been comparatively high in cost. In automotive radars, however, low-cost and simplified systems are requested for their widespread use. When from this viewpoint, the previously described respective radar systems are considered, the pulse radar and the pulse compression radar each require high speed signal processing, so that a price of the radar system have no choice but to soar, whereas the FMCW radar and two-frequency CW radar are systems each acquiring a predetermined range resolution even in comparatively low-speed signal processing, and are promising for a major system in the automotive radars.

Continuous-wave radars such as the FMCW radar and the two-frequency CW radar are systems that acquire a predetermined distance resolution, by modulating continuous wave frequencies within a certain frequency bandwidth (sweep width), by emitting modulated continuous waves toward an object, and by acquiring beat signals between reflected received waves and modulated continuous waves. For this reason, these systems have a problem in that they are liable to interference by radio waves reflected from the roadsurface or those from other automotive radar systems. Among solutions to these problems, there is a method of allocating a radio frequency band differing on a per-radar system basis. A method in which a sweep width differing for each radar system is allocated in this way, is referred to as frequency hopping.

The operating principles of such radar systems indicate that in order to achieve higher range resolutions, there is a need for broader sweep width. It is known in the art, for example, that achieving a range resolution of one meter requires a bandwidth of 150 MHz. As a result, with n radar systems being present, in order for each radar system to achieve the distance resolution of one meter, the bandwidths of 150×n (MHz) are to be required.

Meanwhile, the radio-related laws allocate radio bands on a per-applications basis. Given that a frequency bandwidth allocated for the automotive radar is on the order of 1 GHz, the maximum n that satisfies the equation of 150×n (MHz)<1 GHz will be six. That is, it is turned out that the frequency bandwidth of 1 GHz can contain only some six radar systems.

Also at present, a need for enhancing measurement accuracy in the automotive radar system tends to be increased, and the sweep width to be requested on a per-radar system basis tends to become wider. In the meanwhile, it is unacceptable that only maximum of six vehicles are allowed to run under current road circumstances. With the information technologies developing, radio frequency applications continue to expand, thereby the frequency bandwidth to be allocated for the automotive radar system cannot be anticipated to become broader. That is, interference to occur between radar systems tends to be worsened, which makes it difficult for the problem to be overcome by only the frequency hopping. The automotive radar system would be difficult to become sufficiently widespread unless an alternative solution replacing the frequency hopping is found.

As a solution to such problems, after pulsing continuous waves and code-modulating the phase between the pulsed waves, a method of mixing on the basis of code pattern of the phase has been proposed (e.g., Non-patent Document 1).

Non-Patent Document 1

Akihiro Kajiwara, "Stepped-FM pulse radar for vehicular collision avoidance," IEICE B-11. Vol. J-81-B-11, No. 3. pp. 234-239, May, 1998

DISCLOSURE OF INVENTION

Problem that the Invention is to Solve

A method disclosed in the document, however, shows that in some methods of orthogonalization of code patterns interference waves still remain after mixing, so that sufficient object detection performance will not be achievable in the event of a small input-signal-to-interference wave power ratio, etc., as can easily be imagined. In addition, since an actually acceptable phase width is thought to be on the order of $\pi/64$ at minimum, complete orthogonality in some cases may not be achieved in the circumstances where there exists a plurality of vehicles, such as in heavy traffic situations and parking lots.

The present invention aims to provide a radar system that achieves stable detection of external objects even when a plurality of other radar systems exists in the vicinity.

Means for Solving the Problem

A radar system related to the present invention emits into space, transmission radio waves according to frequency modulated continuous wave reference, and acquires receive signals by receiving the transmitted waves reflected from an external object, as well as computes a distance and a velocity of the external object beat signals obtained from received signals and continuous-wave reference. The radar system is characterized in comprising a pulse generation means for generating pulsed transmit signals by pulsing the continuous-wave reference at an interval unique to the radar system; and an antenna for emitting into space the pulsed transmit signals as the above-described transmission radio waves.

EFFECTS OF THE INVENTION

According to the radar system associated with the present invention, frequency modulated continuous radio waves are pulsed. Furthermore, the pulse repetition interval has been defined as an interval differing from those of other systems, so that the pulses are emitted to external objects. As a result, interference with transmission radio waves of other radar systems is unlikely to occur, so that very advantageous effects are obtained in that even in an environment where a sweep frequency bandwidth is limited, a number of the radar systems can coexist simultaneously and stably.

REFERENCES OF NUMERALS AND SYMBOLS

"13" is a pulse generator, and "16," an antenna.

BEST MODE FOR CARRYING OUT THE INVENTION

Embodiment 1

Figure 1:
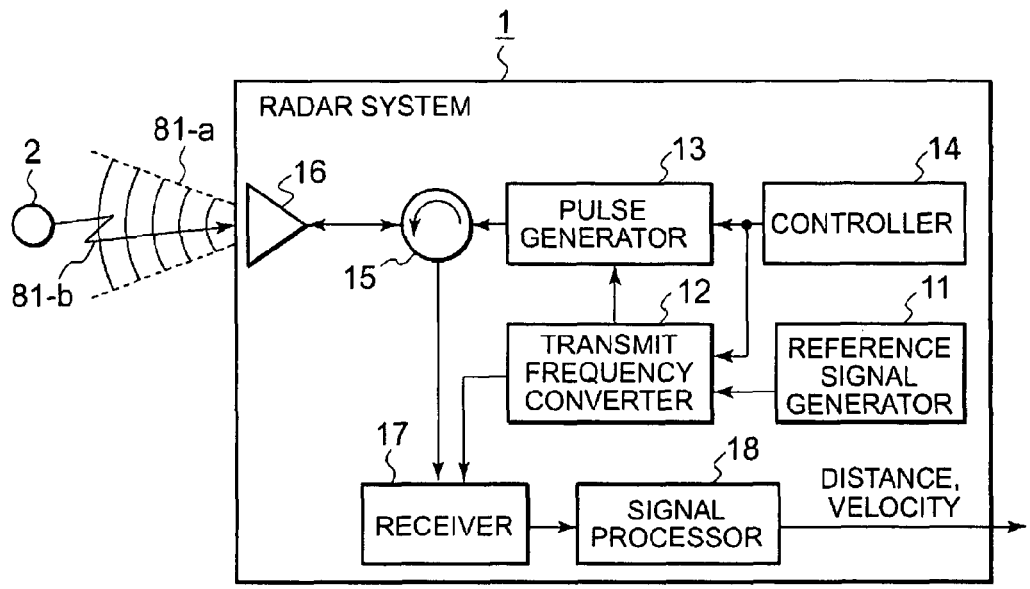
FIG. 1 is a block diagram illustrating a configuration of a radar system according to Embodiment 1 of the present invention.

FIG. 1 is a block diagram illustrating a configuration of a radar system according to Embodiment 1 of the present invention. The radar system 1 shown in the figure includes a reference signal generator 11, a transmit frequency converter 12, a pulse generator 13, a controller 14, a circulator 15, an antenna 16, a receiver 17, and a signal processor 18. Among these components, the reference signal generator 11, the transmit frequency converter 12, the pulse generator 13, and the controller 14 are components for generating mainly transmit signals; the circulator 15 and the antenna 16 are those for bidirectional use; and the receiver 17 and the signal processor 18 are those for processing received signals.

The reference signal generator 11 is a circuit or an elemental device for generating a reference signal having predetermined continuous waves. Reference signal frequency generated by the reference signal generator 11 repeats continuous ascending and descending thereof at every predetermined interval T.

It should be noted that a certain frequency-ascending period or a frequency-descending period is referred to as a sweep, and a continuous time-period formed by one frequency-ascending period, and one frequency-descending period that follows the frequency-ascending period, is referred to as a burst.

The transmit frequency converter 12 is a circuit or an elemental device that frequency-converts, as may be required, reference signals generated from the reference signal generator 11, and that defines a frequency band for use in radio waves emitted from the radar system 1, at the frequency band differing from those of other radar systems. This allows for elimination of its own transmit frequency overlapping those of other radar systems, thus achieving frequency hopping.

The pulse generator 13 is a circuit that converts into pulse signals having a pulse width of $T_p$ ($T_p$ a time-period having a predetermined time-length), a reference signal generated by the reference signal generator 11. The controller 14 is a circuit or an elemental device that controls the operations of both transmit frequency converter 12 and pulse generator 13.

The circulator 15 is a circuit that, according to the timing of pulse-transmit-signals generated by the pulse generator, switches connection of the antenna 16 between the pulse generator 13 and the receiver 17. As a result, while the antenna 16 is connected with the pulse generator 12 via the circulator 15, the antenna 16 serves as a transmit antenna. In addition, while the antenna 16 is connected with the receiver 17 via the circulator 15, the antenna 16 serves as a receive antenna.

It should be understood that although the antenna 16 is common aperture for transmit and receive for system simplicity, the radar system 1 may adopt independently-configured transmit and receive antennas, in which case the circulator 15 can be eliminated.

The antenna 16 emits to an external object 2, pulse signals as transmission radio waves 81-$a$ generated by the pulse generator 13. As a result, the transmission radio waves 81-$a$ are reflected from the external object 2, returning to the antenna 16 as reflected waves 81-$b$.

The receiver 17 is a circuit or an elemental device that detects received signals obtained by receiving with the antenna 16 the reflected waves 81-$b$, to converts into digital signals the received signals at a sampling interval $T_k$, and that thereby mixes digitized received signals with a reference signal generated by the reference signal generator 11, to generate beat signals.

The signal processor 18 is a circuit or an elemental device that detects according to the beat signals generated by the receiver 15 a relative distance and velocity of the external object 2.

Figure 2:
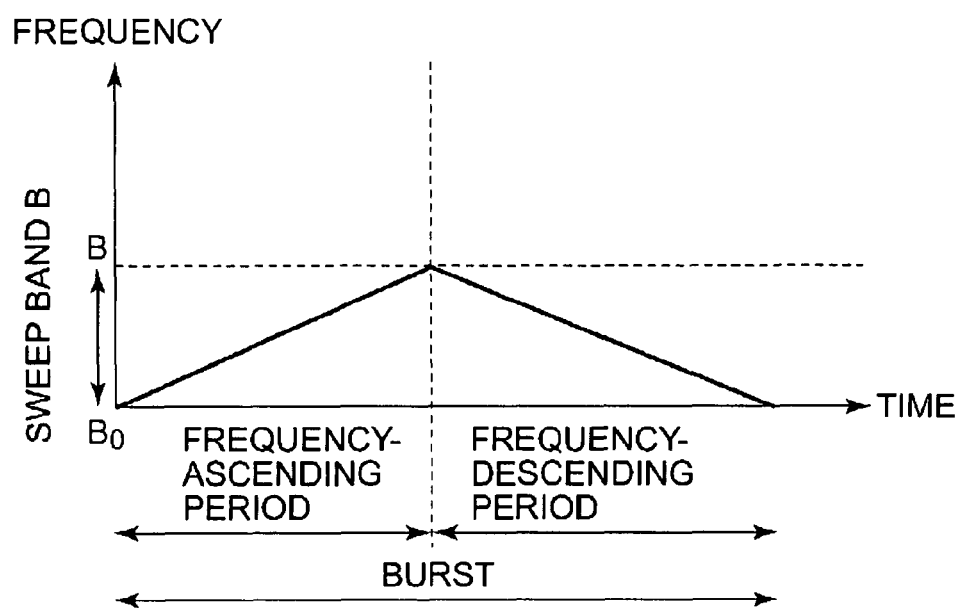
FIG. 2 is a diagram illustrating an example of waveforms of reference signals generated by a radar system according to Embodiment 1 of the present invention.

Subsequently, the operation of the radar system according to Embodiment 1 of the present invention will be described. The reference signal generator 11 generates a frequency modulated reference signal having the frequency bandwidth B as shown in FIG. 2. The reference signal, whose minimum frequency is set to a predetermined base-band frequency $B_0$, increases up to a frequency $B_0+B$ during the frequency-ascending period T, and decreases down to the frequency $B_0$ during the frequency-descending period T.

A transmit frequency converter 12 further modulates into a frequency within a predetermined allowable frequency band, the frequency of the frequency-modulated reference signal generated by the reference signal generator 11, where a minimum frequency f_m of the allowable band is determined according to a control signal from the controller 14. The controller 14 preliminarily stores an allowable frequency unique to e.g., the radar system 1, and feeds to the transmit frequency converter 12 the allowable frequency as the control signal. As a method of preliminarily storing the allowable frequency unique to the radar system 1, an allowable frequency that does not overlap those of other radar systems may be preliminarily allocated prior to factory shipment. Furthermore, in actual use, a user may as well set the allowable frequency depending on circumstances where the radar system 1 is located (e.g., where, when the radar system 1 is a automotive radar, the user determines the frequency, taking into account a surrounding traffic situation).

Figure 3:
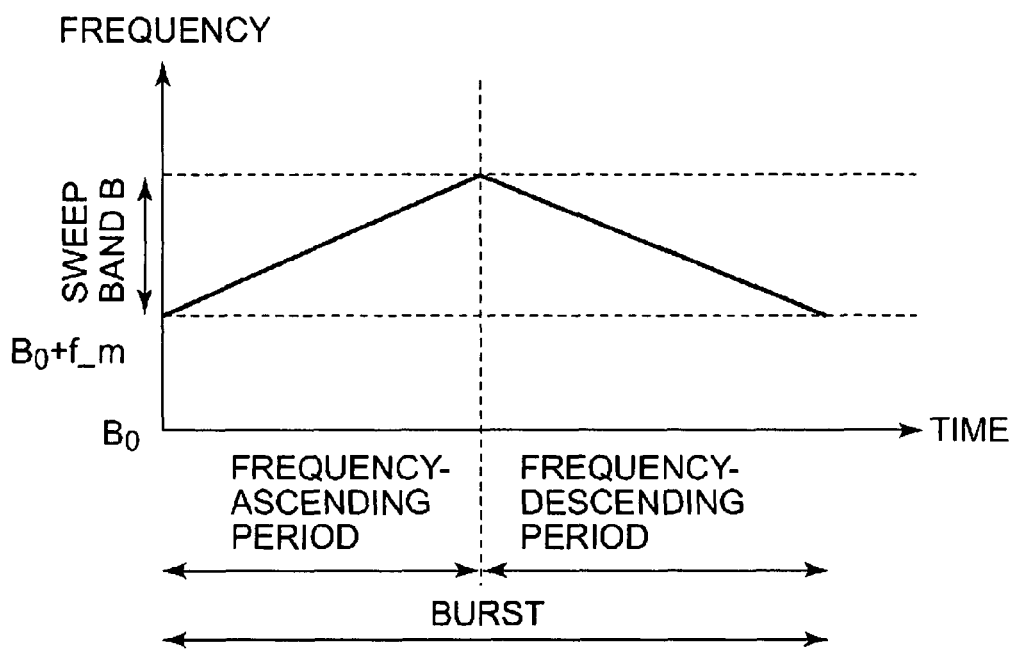
FIG. 3 is a diagram illustrating an example of transmission waveforms after frequency conversion in the radar system according to Embodiment 1 of the present invention.

Resultingly, the reference signal that has been frequency-modulated from the frequency $B_0$ to the frequency $B_0+B$, through the transmit frequency converter 12, turns out to be an FM transmit signals that are frequency-modulated having the frequencies $B_0+f\_m$ through $B_0+B+f\_m$. FIG. 3 illustrates such an FM transmit signal. In this way, frequency-modulation within an allowable frequency band differing on a per-radar system basis results in frequency hopping being achieved, thus leading to easy suppression of interference waves in signal processing of the received waves.

Subsequently, the pulse generator 13 pulses, with a pulse width $T_p$ and at a pulse repetition interval PRI, the FM transmit signal generated from the transmit frequency converter 12, where the pulse interval RPI is determined according to a control signal from the controller 14. Similarly, the controller 14 preliminarily stores a pulse repetition interval unique to the radar system 1, and provides the pulse generator 13 with the stored pulse repetition interval RPI, as a control signal. Here, a method of preliminarily storing the pulse repetition interval PRI may be the same as that of storing the allowable bandwidth f_m. As a result, the pulse generator 13 outputs, as pulse transmit signal, part of the FM transmit signal generated from the transmit frequency converter 12.

The pulse transmit signals outputted from the pulse generator 13 are emitted as transmit waves 81-a into space from the antenna 16 through the circulator 15, part of which signals, after reflected from the external object 2, return to the antenna 16 as reflected waves 81-b.

Figure 4:
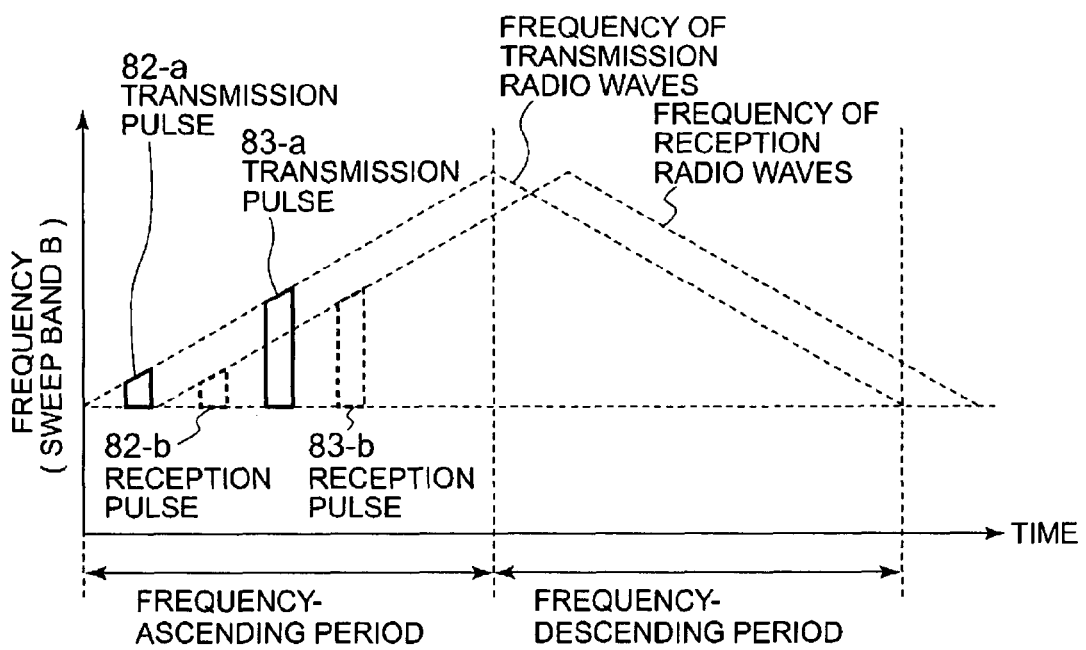
FIG. 4 is a diagram illustrating relationship between transmission and reception pulses and received sampling intervals in the radar system according to Embodiment 1 of the present invention.
Figure 5:
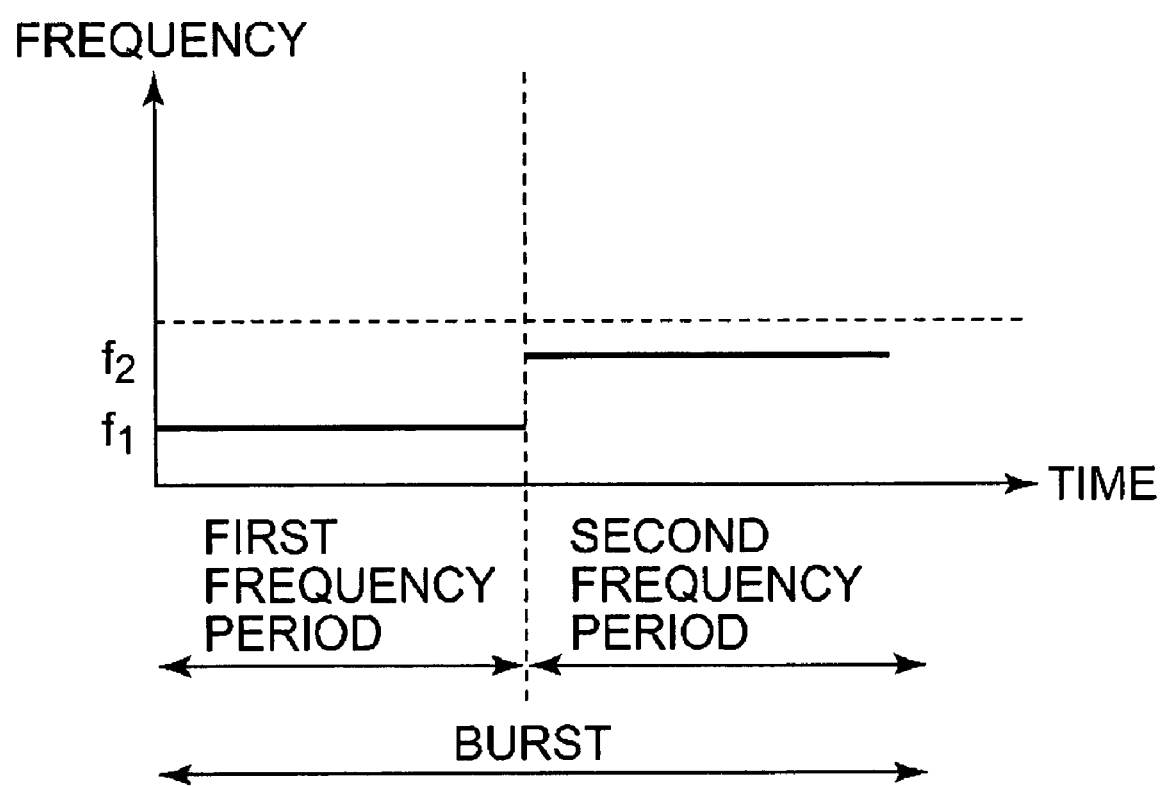
FIG. 5 is a diagram illustrating an example of waveforms of reference signals generated by a radar system according to Embodiment 2 of the present invention.

When the antenna 16 receives the reflected waves 81-b as received waves, it feeds received signals—analog signals— into the receiver 17 via the circulator 15. FIG. 4 is a schematic diagram illustrating a relationship between a transmission pulse obtained by pulsing, by using the pulse generator 13, part of the FM transmit signal generated by the transmit frequency converter 12, and a reception pulse to be obtained as reflected waves. As shown in the figure, although continuous signals during the frequency-ascending period are a plurality of transmission pulses (e.g., the reception pulses 82-b and 83-b), with the reference signal being frequency-modulated, each transmission pulse increases its frequency. Furthermore, emitting a plurality of the transmission pulses results in a plurality of reception pulses—their reflected waves—being obtained. Since respective reception pulses (e.g., the reception pulses 82-b and 83-b) travel to the external object 2 and then return to the antenna 16, there will occur predetermined time-lags after their transmission. Furthermore, while external objects are in motion, frequency modulation due to the Doppler effect will occur.

The receiver 17 converts into digital signals at a predetermined sampling interval $T_K$, received signals received by the antenna 16, and moreover, mixes the digital signals with the FM transmit signal then being generated from the transmit frequency converter 12, to generate beat signals. The beat signals generated by the receiver 17 are outputted into the signal processor 18.

Since received signals at the receiver 17 has undergone influences of a time lag due to a distance to the external object 2, and of frequency modulation due to moving effects of the external object 2, analyzing the beat signals obtained from the received signals and internal signals, enables a relative range and velocity of the external object 2 to be acquired. Radars based upon such principles are widely known as FMCW radars.

It should be noted that the radar system 1 has features in that in place of using continuous waves as transmit waves, the system employs pulsed waves obtained by pulsing the frequency-modulated continuous waves, and moreover, a transmission pulse repetition interval PRI is defined as a value unique to the radar system 1. Because of the transmission pulse repetition interval PRI being unique to the radar system 1, no interference will occur between the reception pulses and other radar systems' transmission radio waves or their reflected waves. This enables the radar system 1 to stably measure a distance to the external object 2 even in surroundings where a plural of radar systems coexist.

The signal processor 18 computes beat signals' frequencies $f_{up}$ and $f_{down}$ by frequency-analyzing the beat signals during both frequency-ascending period and frequency-descending period. The principle of the FMCW radars indicate that given that the frequency of the beat signals obtained by the receiver 17 during the frequency-ascending period, is $f_{up}$, and that the frequency of the beat signals obtained by the receiver 17 during the frequency-descending period, is $f_{down}$, then a relative range $R_{up}$ to and a relative velocity v to the external object 2 are given by Equation (1) and (2). Thus, by substituting into Equation (1) and (2) the computed $f_{up}$ and $f_{down}$, the signal processor 18 computes R and v, in which equations c denotes the velocity of light.

Equation 1
$$R = -\frac{cT}{4B}(f_{up} - f_{down}). \quad (1)$$

Equation 2
$$v = -\frac{\lambda}{4}(f_{up} + f_{down}). \quad (2)$$

Frequency analysis performed by the signal processor 18 can utilize known various kinds of methods such as a fast Fourier transform. The radar system 1 uses pulse waves, so that performing the Fourier transform along a pulse train at the signal processor 18 allows interference influence to be further reduced.

Here, "performing the Fourier transform along a pulse train" refers to the following: When beat signals obtained at a k-th sampling time counted from the time of a transmission pulse having been transmitted are summed to Fourier-transform for each of a plurality of transmission pulses, this k-th sampling value is Fourier-transformed along a pulse train.

Since the radar system 1 uses the transmission pulse repetition interval PRI that is unique to the radar system 1, even if part of transmission pulses would happen to interfere with transmission radio waves from other radar systems, and their reflected waves, no interference waves produced by the other part of the pulses would be anticipated. Therefore, performing the Fourier transform along a pulse train enables the interference influence due to the part of the pulses to be reduced.

As described above, in Embodiment 1 of the present invention, pulses has been transmitted at the transmission pulse repetition interval PRI unique to the radar system 1. As a result, pulse transmission at intervals differing from those of pulses transmitted by other radar systems can suppress the frequency of occurrence of interference waves.

It should be apparent that in Embodiment 1 of the present invention, eliminating the transmit frequency converter 12 and then merely employing the transmission pulse repetition interval PRI unique to the radar system 1 allows frequency of occurrence of interference waves to be suppressed, in which case the controller 14 can eliminate processing and functions associated with an allowable frequency band.

Embodiment 2

Although the radar system according to Embodiment 1 has adopted an FMCW radar system, a two-frequency CW system can be employed. A radar system according to Embodiment 2 has such features. A block diagram of the radar system according to Embodiment 2 is also shown in FIG. 1. In Embodiment 2, the reference signal generator 11 as shown in the figure generates during a first frequency period, a continuous wave reference signal of a constant frequency $f_1$, and during a second frequency period, a continuous wave reference signal of a constant frequency $f_2$ (where it is assumed that $f_1 > f_2$). Here, both first frequency period and second frequency period are assumed to be T, and a pair of successive first and second frequency periods is assumed to constitute one burst.

In Embodiment 2 of the present invention, among constituent elements shown in FIG. 1, the transmit frequency converter 12, the pulse generator 13, the controller 14, a circulator 15, the antenna 16, and the receiver 17 are the same as those in Embodiment 1, therefore their explanations will be omitted.

Next, the operation of the radar system according to Embodiment 2 of the present invention will be described. A continuous wave reference signal generated from the reference signal generator 11 is outputted into the transmit frequency converter 12. The transmit frequency converter 12, as is the case with Embodiment 1, generates a continuous wave reference signal of a frequency $f_1 + f\_m$ (constant) during the first frequency period, according to a minimum frequency $f\_m$ unique to the radar system 1, and a continuous wave reference signal of a frequency $f_2 + f\_m$ (constant) during the second frequency period, where the minimum frequency $f\_m$ unique to the radar system 1 is a value stored preliminarily by the controller 14. These continuous reference signals generated are outputted into the pulse generator 13.

The pulse generator 13 pulses the continuous reference signals at a transmission pulse repetition interval PRI being stored preliminarily by the controller 14, unique to the radar system 1. Pulsed transmit signals are emitted into space, from the antenna 16 through the circulator 15, part of which signals are received, after reflected from the external object 2, by the antenna 16. As has been explained in Embodiment 1, since transmission radio waves are pulsed according to the PRI unique to the radar system 1, and furthermore, frequency-hopped to a frequency band unique to the radar system 1, by the transmit frequency converter 12, there are features that allow interference waves to rarely occur.

Reflected waves received by the antenna 16 are fed into the receiver 17 through the circulator 15. The receiver 17 converts the received signals into digital signals, as well as mixes the digital signals with an internal reference signal generated by the transmit frequency converter 12, to produce beat signals, then outputs the beat signals into the signal processor 18.

The signal processor 18 acquires an object velocity from a frequency whose peak is obtained through analysis of each sampling data, and a distance is computed as follows: First, the phase of frequency component by which a peak is obtained during the first frequency period is assumed to be $\phi_1$, and that by which a peak is obtained during the second frequency period peak is obtained is assumed to be $\phi_2$, and the frequency phase difference $\Delta\phi = \phi_1 - \phi_2$ is computed. Then, by using the computed value $\Delta\phi$ the distance R is computed by Equation (3).

Equation 3

$$R = \frac{c\Delta\phi}{4\pi(f_2 - f_1)}. \qquad (3)$$

As has been described above, even when the radar system 1 is configured with the two-frequency CW system, since frequency-hopping uses a frequency band unique to the radar system 1, and furthermore, pulse transmission is achieved at the transmission pulse repetition interval unique to the radar system 1, then occurrence of interference waves can be suppressed.

It should be noted that in Embodiment 2 of the present invention, Fourier-transforming along a pulse train can diminish, as indicated in Embodiment 1, influences due to interference waves generated from part of pulses.

It should be apparent that with no frequency-hopping being performed as is the case with Embodiment 1, merely transmitting pulses at a transmission pulse repetition interval unique to the radar system 1 can suppress the occurrence of the interference waves.

It should be understood that the features of the present invention, as described in Embodiment 1 and 2, are easily applicable to a radar system of a stepped chirp radar system that performs step-wise frequency modulation.

Embodiment 3

Figure 6:
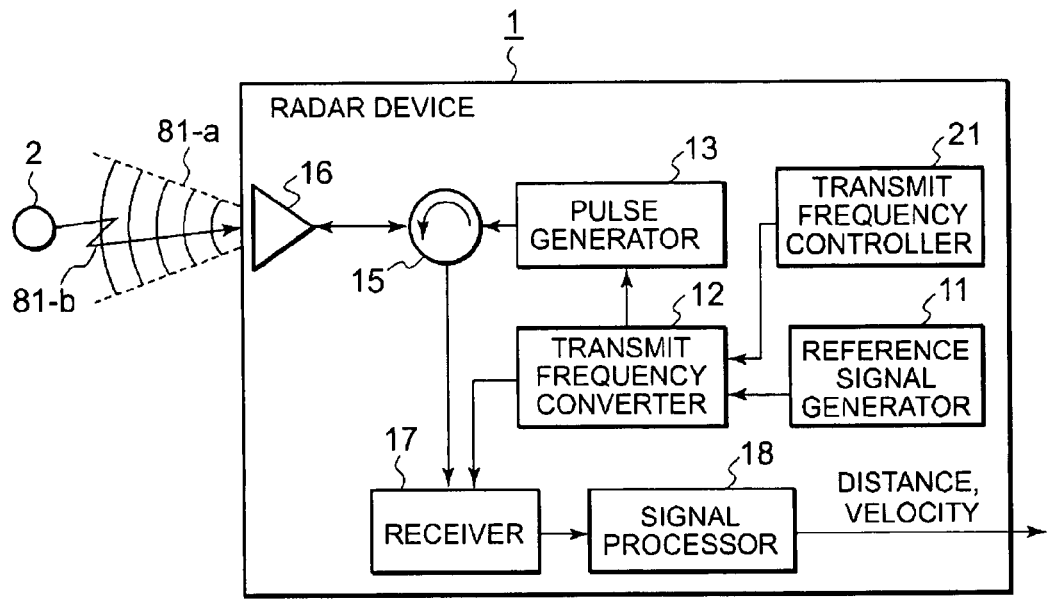
FIG. 6 is a block diagram illustrating a configuration of a radar system according to Embodiment 3 of the present invention.

FIG. 6 is a block diagram illustrating a configuration of a radar system according to Embodiment 3 of the present invention. A new element in the figure is a transmit frequency controller 21. Explanations on other constituent elements will be omitted because they are the same as those in Embodiment 1.

The transmit frequency controller 21 is a unit that replaces the controller in Embodiment 1, and controls a transmit frequency converter 12 in such a manner that a value of a minimum frequency $f\_m$ by which the transmit frequency converter 12 frequency-modulates a reference signal, is changed for each of predetermined time-cycles. Here, the time-cycle by which the transmit frequency controller 21 changes the value of $f\_m$ may be set, on the basis of, e.g., a burst or a transmission pulse repetition interval (PRI). Namely, when setting the time-cycle based on the burst, a value n×burst (n: counting number) is set as time-cycle length, and when also setting the frequency with reference to the transmission pulse repetition interval, a value n×pulse is set as time-cycle length.

A method of selecting mutually differing frequencies f_m could be the method in which with several minimum frequencies f_m preliminarily stored by e.g., the transmit frequency controller 21, then one f_m from among a plurality of f_m stored is to be selected. In that case, any one of frequencies f_m is to be selected based on a generated random number while generating random numbers. With this arrangement, even if other similar radar systems exist in the vicinity, mutually differing frequencies f_m are to be selected, thus permitting the radar systems to coexist, with conflict of frequency band being avoided.

In general, in order for an FMCW radar system to acquire a high distance resolution, there is a need for expanding a sweep width, however, radio-related laws restrict the frequency bandwidth (spectrum) for each application. Therefore, when a plurality of similar radar systems coexist in the range with a near distance, the possibility of conflicts of sweep frequency bands among radar systems cannot be eliminated. This results in interference waves being generated because one or more radar systems coexist in the identical sweep frequency band. However, as a method according to Embodiment 3 of the present invention, changing minimum frequencies for each predetermined time-cycle leads to frequent occurrences of interference waves because a plurality of radar systems temporarily using the identical sweep frequency band coexists in the vicinity. Even if measurement accuracy is greatly worsened, it can be recovered because conflicts of the frequency bands are avoided in the course of a time that is several times as long as the transmission pulse repetition interval or the burst period.

It should also be noted that similar effects can be obtained even when the configuration of the embodiment is applied to that of the two frequency CW system indicated in Embodiment 2.

Embodiment 4

Figure 7:
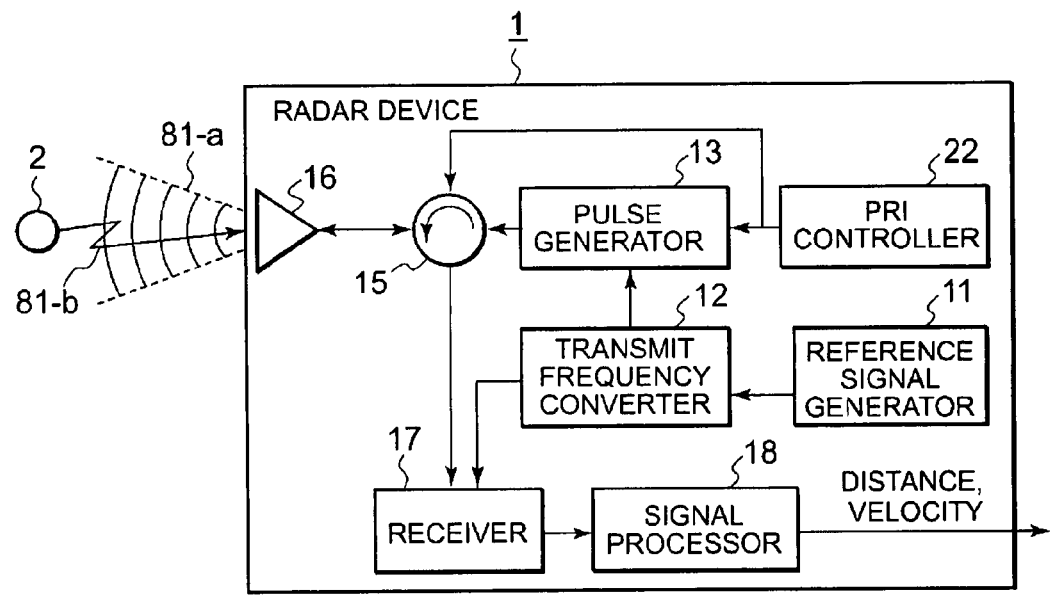
FIG. 7 is a block diagram illustrating a configuration of a radar system according to Embodiment 4 of the present invention.

FIG. 7 is a block diagram illustrating a configuration of a radar system according to Embodiment 4 of the present invention. A new element in the figure is a PRI controller 22. Explanations on other constituent elements will be omitted because they are the same as those in Embodiment 1.

The PRI controller 21 is a unit that replaces the controller 14 in Embodiment 1, and controls the pulse generator 13 and the circulator 15 in such a manner that a pulse repetition interval (PRI) with which the pulse generator 13 pulses a continuous wave transmit signal, is changed for each predetermined time-cycle. Here, the time-cycle with which the PRI converter 21 changes the value of the PRI may be defined according to, for example, a burst or the number of transmitted pulses. Namely, when setting the time-cycle with reference to the burst, a new PRI is set on a per-n-burst (n: counting number) basis, meanwhile when setting the frequency based on the number of transmission pulses, the new PRI is defined on a per-n-pulse basis.

As a method of selecting mutually-differing PRIs, there is a possible method that selects one from among the plurality of stored PRIs, with a plurality of PRIs stored preliminarily by, e.g., the PRI controller 22. In that case, any one of PRIs is to be selected based on a generated random number while generating random numbers. With this arrangement, even if other similar radar systems exist in the vicinity, mutually-differing PRIs are to be selected, so that, under conflict of frequency bands being avoided, the radar system and other similar radar systems are allowed to coexist.

In such a case, bidirectional switchover intervals of a circulator 15 are also changed. This allows receive waves according to the defined PRI to be received.

Even if, interference waves have occurred to part of the pulses, among reception pulses corresponding to a plurality of transmission pulses, the configuration as has been described previously will hardly allow the interference waves to occur to all of the reception pulses. Therefore, even if measurement accuracy would temporarily be worsened, it could recover in the course of several transmission pulse periods or several bursts intervals.

This results in reliable detection performance of the external objects, even when a plurality of similar radar systems coexists in a narrowed zone.

It should be noted that the configuration in which the PRI indicated in the embodiment is changed according to a predetermined time-cycle may be combined with the Fourier transform along a pulse train as indicated in Embodiment 1, thereby allowing for interference influence to be further reduced.

In addition, combining this configuration with frequency hopping as has been indicated in Embodiment 1 and 2 allows interference waves to occur less frequently.

It should also be noted that similar effects can be obtained even when the configuration of the embodiment is applied to that of the two frequency CW system indicated in Embodiment 2.

Embodiment 5

Figure 8:
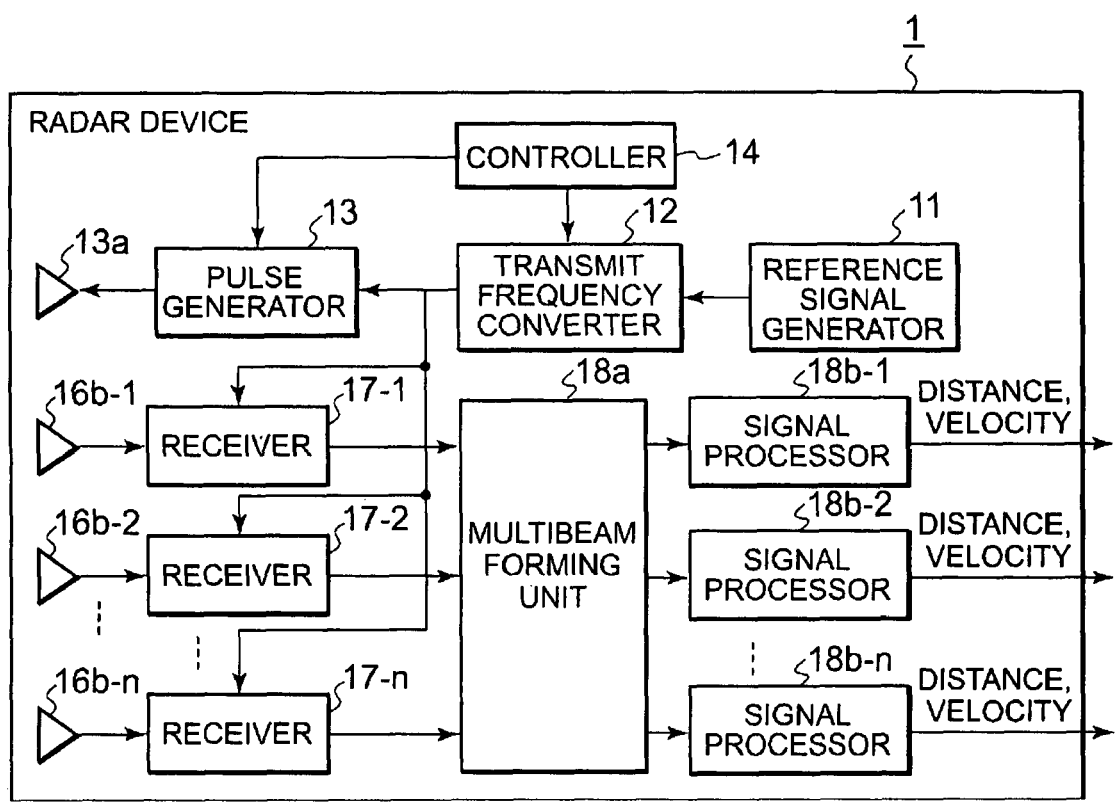
FIG. 8 is a block diagram illustrating a configuration of a radar system according to Embodiment 5 of the present invention.

FIG. 8 is a block diagram illustrating a configuration of a radar system according to Embodiment 5 of the present invention. New constituent elements in comparison with those in Embodiment 1 are as follows. First, the circulator 15 has been eliminated, and a transmit-only antenna 16a is connected with the pulse generator 13 instead. Then, element antennas 16b-1 through 16b-n (n: counting number) are provided as a receive-only antenna, to constitute an array antenna assembly, as well as respective receivers (assigned to receivers 17-1 through 17-n) are provided for each receive antenna element. Furthermore, a multibeam forming unit 18a is provided for multibeam-forming according to received signals of the receivers 17-1 through 17-n, and then, independent signal processors (signal processors 18b through 18b-n) for each beam formed by the multibeam-forming-unit-18a, is provided. Explanations on other constituent elements will be omitted because they are the same as those in Embodiment 1.

Next, the operation of the radar system according to Embodiment 5 of the present invention will be described. The reference signal generator 11 generates a frequency modulated reference signal having the frequency bandwidth B as shown in FIG. 2. A transmit frequency converter 12 further modulates into a frequency within a predetermined available frequency band, the frequency of the frequency-modulated reference signal generated by the reference signal generator 11. Here, as is the case with Embodiment 1, the controller 14 provides the transmit frequency converter 12 with a minimum frequency f_m in an allowable frequency band unique to the radar system 1, which allows frequency hopping to be implemented. It should be noted that, a configuration may be adopted in which, by using, in place of the controller 14, an unit such as the transmit frequency controller 21 as has been used in Embodiment 3, the minimum frequency f_m is changed for each several burst, or each transmission of several pulses.

Then, the pulse generator 13 pulses with a pulse width $T_p$ and at a pulse repetition interval PRI, an FM transmit signal generated from the transmit frequency converter 12, where, as is the case with Embodiment 1, the controller 14 provides the transmit frequency converter 12 with a pulse repetition interval PRI unique to the radar system 1. As a result, no interference waves would be generated to most of transmission pulses even though part of pulses would cause the interference waves because of the pulse repetition interval being unique to the radar system 1. This enables multiple radar systems to concurrently operate within a given frequency band.

It should be noted that, with the controller 14 in place of a unit such as a PRI controller 22 as has been used in Embodiment 4, a configuration in which the transmission pulse repetition interval is changed for each several burst, or each transmission of several pulses, may be adopted.

The transmit signals pulsed by the pulse generator 13 are emitted into space from the antenna 16-a, part of which signals, after reflected from the external target 2, are received by the antenna elements 16b-1 through 16b-n. As a result, the antenna elements 16b-1 through 16b-n feed the received signals into the corresponding receivers 17-1 through 17-n. The receivers 17-1 through 17-n convert at a predetermined sampling interval the received signals into respective digital signals, by mixing the digitized signals with a frequency-modulated internal reference signal generated from the transmit frequency converter 12, producing beat signals, then outputting the beat signals into the signal processor 18a.

The multibeam forming unit 18a Fourier-transforms along an antenna array the beat signals outputted from the receivers 17-1 through 17-n, to form multibeams. In this way, the beat signals are converted into beam output signals having a directional gain in respective multibeam directions. Subsequently, the signal processors 18b-1 through 18b-n detect, as is the case with Embodiment 1 or 2, peaks of each beam-output signal, to compute their frequencies, and then, by substituting them into Equations (1) and (2), computes a range and velocity of an object.

Even if use of a frequency and PRI identical with those in other radar systems would have caused interference waves in directions of part of the beams, this arrangement would produce no interference waves in directions differing from those of such directions. Moreover, beam directions are obtained from the multibeams whose peaks have been detected.

It should be noted that in this embodiment, although, as the antenna elements 16b-1 through 16b-n, separately-disposed antenna elements have constituted an array antenna assembly, a multibeam configuration by a mechanical or an electronic scanning scheme may be implemented, in which case, only one receiver may be arranged as is the case with Embodiment 1, to process each beam on a time-division basis. Even if such a configuration is adopted, the features of the present invention will not be lost, therefore, obviously effects of suppressing interference waves is acquired.

In addition, the embodiment has adopted the FMCW radar system, however, the embodiment is easily configured by a radar system on the basis of the two-frequency CW system.

Embodiment 6

Figure 9:
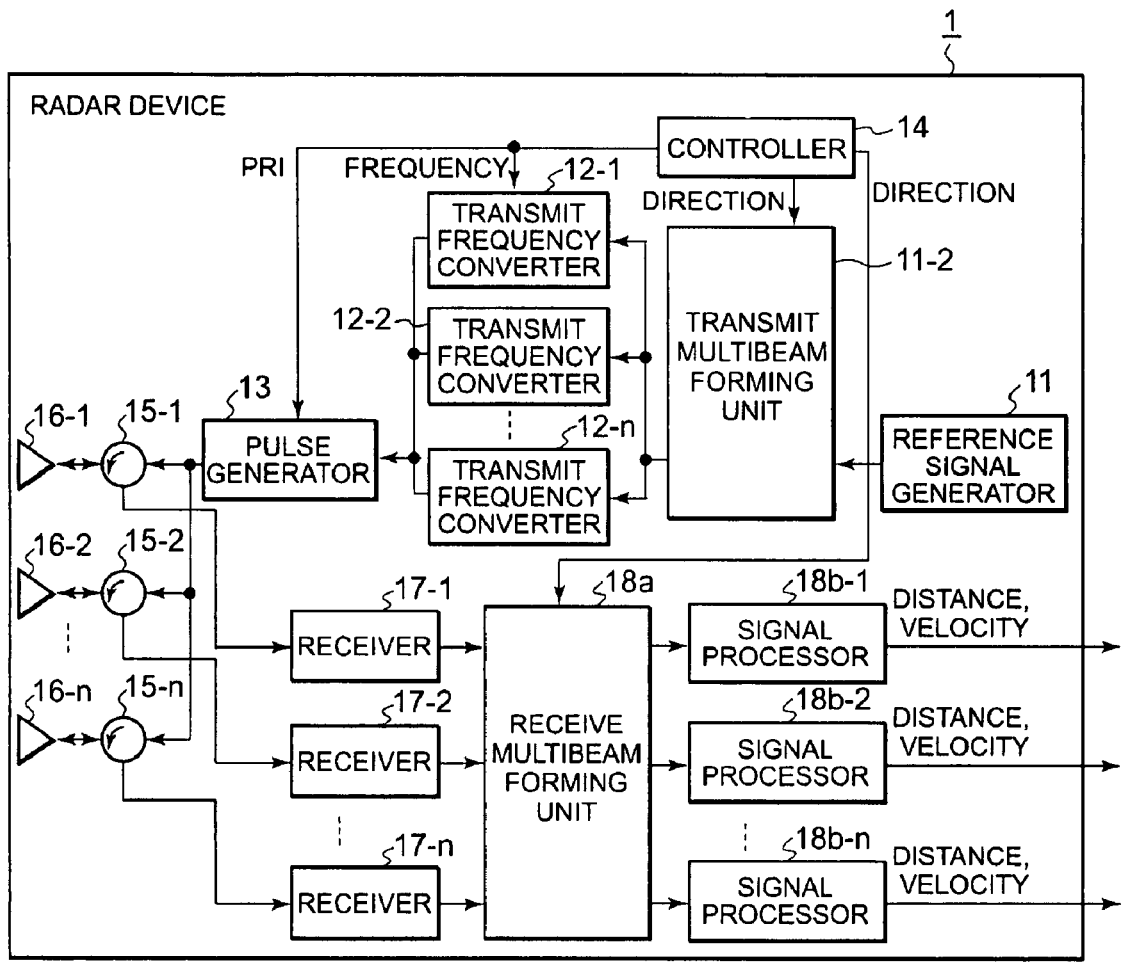
FIG. 9 is a block diagram illustrating a configuration of a radar system according to Embodiment 6 of the present invention.

FIG. 9 is a block diagram illustrating a configuration of a radar system according to Embodiment 6 of the present invention. Embodiment 6 has a feature in that in addition to Embodiment 5, the multibeam configuration is also implemented on the transmit side. Because the multibeam configuration is also implemented on the transmit side, with a combination of a PRI, a minimum frequency f_m and beam direction values being defined as that unique to the radar system 1, interference waves can be further suppressed.

New constituent elements in comparison with those in Embodiment 5 are as follows. First, a transmit multibeam forming unit 11-2 has been provided for performing a transmit-multibeam-forming process, based on a frequency-modulated reference signal generated by the reference signal generator 11. Furthermore, in order to transmit-frequency-convert each of the multibeams formed through the transmit-multibeam forming process, a plurality of transmit-frequency converter (transmit frequency converters 12-1 through 12-n, where n is a counting number of two or more: hereinafter the same applies) has been provided. Furthermore, bidirectional antenna elements 16-1 through 16-n have been provided as antenna elements, and circulators 16-1 through 16-n have been provided for switching transmission/reception of the antenna elements 16-1 through 16-n.

Still furthermore, the controller 14 in Embodiment 6 is designed to provide a base frequency of the frequency hopping for each of the transmit frequency converters 12-1 through 12-n; the PRI, for a pulse generator 13; and beam directions, for the transmit-multibeam-forming-unit 11-2 and the receive-multibeam-forming-unit 18a. Here, beam directions as referred to do not need to include information that directly points the directions. When beams are configured to point mutually-differing directions, for instance, providing, for other radar systems, information for identifying one of the beams will lead to indirectly indicating a multibeam direction. Such information suffices as beam direction information.

With this, a combination of a beam direction, the base frequency of frequency hopping, and a transmission pulse repetition interval, is unique to the radar system 1. Here, the fact that the combination of the beam direction, the base frequency of the frequency hopping, and the transmission pulse repetition interval turns out to be unique to the radar system 1, suggests that there are no other radar systems present having the combination entirely identical with that of the radar system 1—the combination of the beam direction, the base frequency of the frequency hopping, and the transmission pulse repetition interval. With this arrangement, even though, in part of the beams, conflicts of a frequency hopping band and a transmission pulse repetition interval would occur among a plurality of radar systems, and resultantly produce interference, no conflicts in other beams would occur, thus avoiding occurrence of interference waves. Consequently, by using beams that produce no interference waves, correction and interpolation become possible, which enables a distance to an external object and location of the object to be computed.

Embodiment 7

Figure 10:
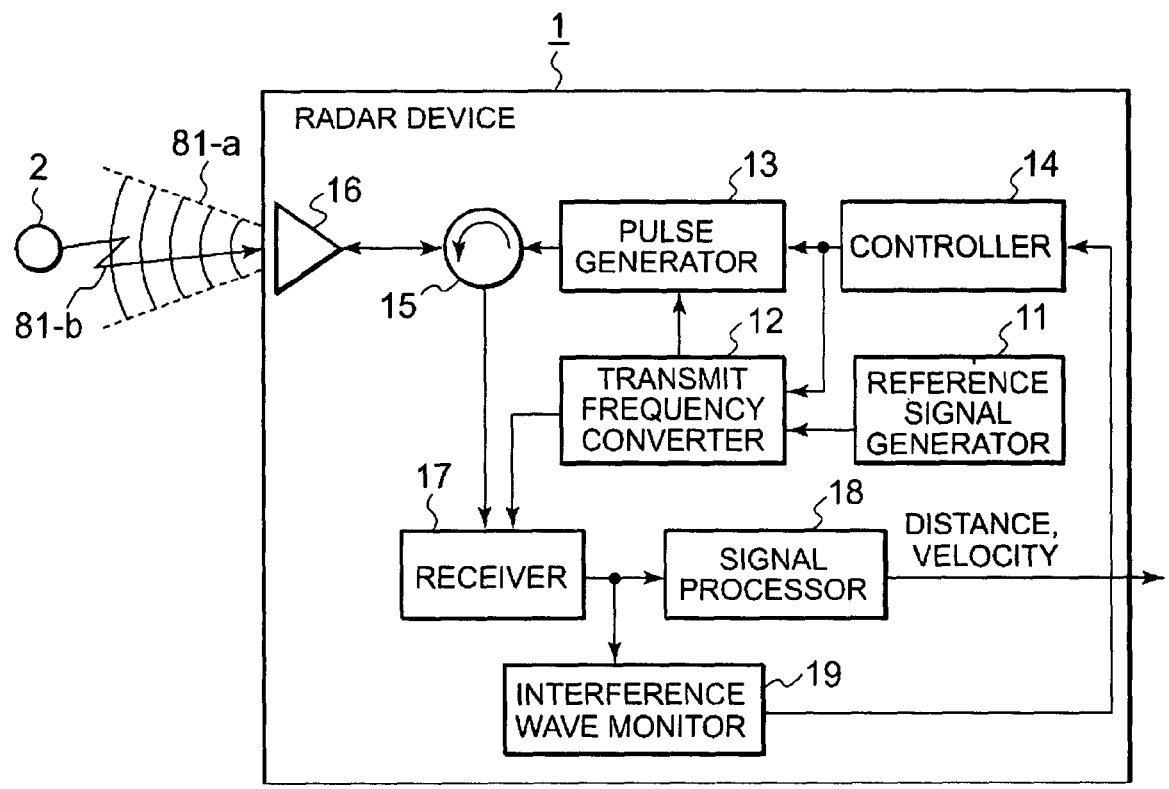
FIG. 10 is a block diagram illustrating a configuration of a radar system according to Embodiment 7 of the present invention.

FIG. 10 is a block diagram illustrating a configuration of a radar system according to Embodiment 7 of the present invention. In the figure, a new element is an interference monitor 19. The interference monitor 19 monitors a received signal frequency and PRI outputted from receiver 17, and the controller 14 in Embodiment 7 of the present invention changes, according to the monitoring results, the frequency and PRI of the radar system. Explanations on other constituent elements will be omitted because they are the same as those in Embodiment 1.

Subsequently, the operation of the radar system according to Embodiment 7 of the present invention will be described. The operations of the reference signal generator 11, the transmit frequency converter 12, the pulse generator 13, the circulator 15, the antenna 16, and the receiver 17 are the same as those in Embodiment 1. An interference monitor 19 detects interference waves according to output from the receiver 17, and output a signal into the controller 14 when occurrence of the interference waves is determined.

When receiving from the interference monitor 19 a signal of detecting occurrence of the interference waves, the controller 14 determines that a conflict of the PRI or the frequency band currently-used for frequency hopping has occurred between its own radar system and other neighboring radar systems, and then changes the current frequency hopping band or PRI. There are several possible methods for changing the frequency hopping band and PRI. For example, when the interference waves are produced owing to other CW (continuous-wave) radars, the radar system undergoes an influence of interference waves due to a plurality of pulses, even in use of another PRI, so that frequency overlapping needs to be eliminated by changing the frequency hopping band. Since, when the interference waves are pulses, changing a PRI will suffice, change of only the PRI may be implemented.

The thus provided interference monitor 19 enables the radar system in Embodiment 7 of the present invention to suppress interference waves occurring between its own radar system and other radar systems.

Embodiment 8

Figure 11:
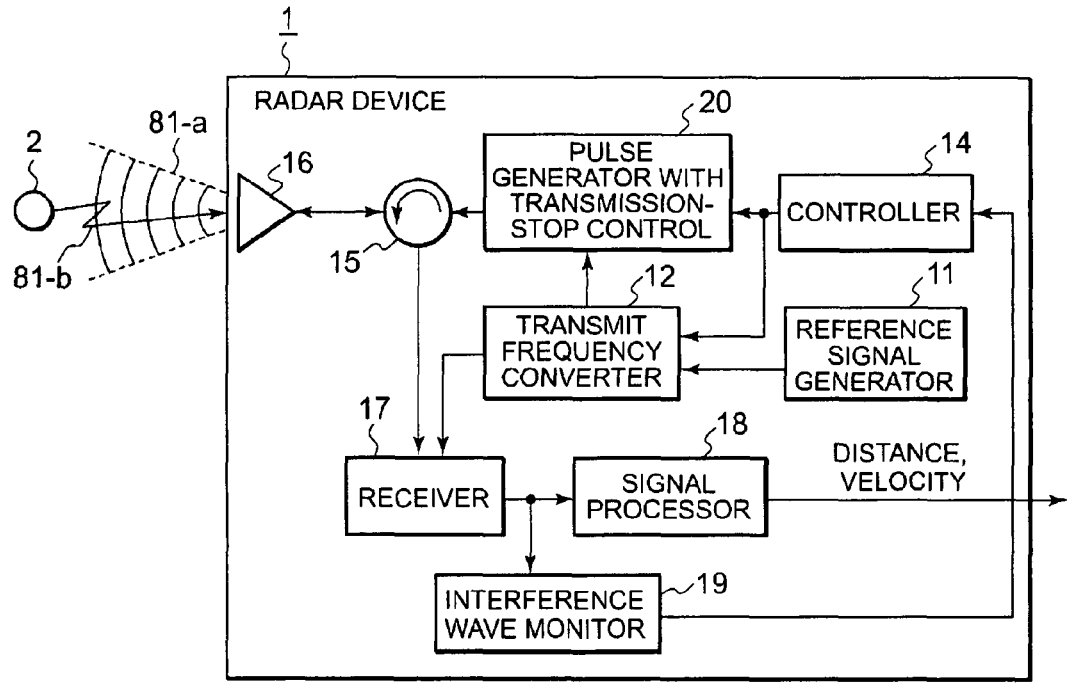
FIG. 11 is a block diagram illustrating a configuration of a radar system according to Embodiment 8 of the present invention.

FIG. 11 is a block diagram illustrating a configuration of a radar system according to Embodiment 8 of the present invention. In the figure, compared with those in Embodiment 7, a new constituent element is a pulse generator 20 with transmission-stop-control. The pulse generator 20 with transmission-stop-control pulses continuous waves as well as has a feature of temporarily stopping pulse generation. Explanations on other constituent elements will be omitted because they are the same as those in Embodiment 7.

With this arrangement, the radar system according to Embodiment 8 temporarily stops emission of radar waves thereof. In the meantime, the interference monitor 19 can identify the presence or absence of signals obtained by receiving transmission radio waves emitted from other radar systems. In that case, the received signals do not include those of radar waves emitted from its own radar system, so that substantially all of the signals are caused by interference waves. Therefore, in order to detect occurrence of the interference waves, with influence due to its own radar wave emission being suppressed, its own radar system can more accurately detect the occurrence of the interference between its own and other radar systems.

Embodiment 9

Figure 12:
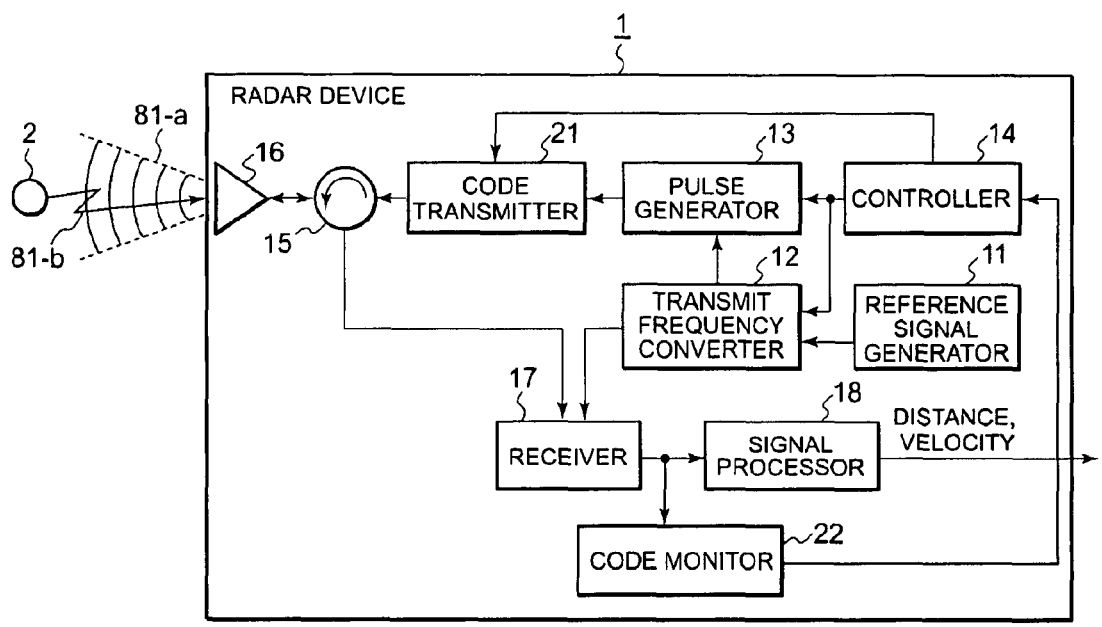
FIG. 12 is a block diagram illustrating a configuration of a radar system according to Embodiment 9 of the present invention.

FIG. 12 is a block diagram illustrating a configuration of a radar system according to Embodiment 9 of the present invention. In the figure, a new element, in comparison with those in Embodiment 1, is that a code-transmit-circuit 21 and a code monitor 22 are provided. The code transmitter 21 is a circuit or an elemental device that converts into a pulsed signal encoded information on the PRI and the frequency hopping band being used in the radar system 1, and then transmits on a time-division basis the pulsed signal, and pulsed waves based on the FMCWs outputted from the pulse generator 13. In addition, the code monitor 22 is a circuit or an elemental device that monitors encoded information on the frequency hopping band and the PRI each transmitted from other radar systems. A controller 14 controls, based on the information acquired by the code monitor 22, the PRI and the frequency hopping band of the radar system 1 as well as determines, based on codes of the other radar system received by the code monitor 22, a code transmitted by the code transmitter 21. Explanations on other constituent elements will be omitted because they are the same as those in Embodiment 1.

This configuration allows for easy selection of a PRI and a frequency hopping band unique to the radar system 1.

It should be noted that, as shown in FIG. 12, a method of code-transmission may adopt a time-division between continuous waves and pulsed transmission radio waves, or alternatively adopt a configuration in which a predetermined frequency band is preliminarily allocated for code transmission, then, separately from continuous wave pulses such as FMCW, by using at any given time the predetermined frequency band, signals are transmitted/received.

Furthermore, a method of easily allocating to the radar system 1 another code different from codes used by other radar systems, will be implemented, e.g., as follows:

(1) First, an identification tag for assigning order, for each radar system is preliminarily provided, then the frequency hopping band, codes representing the PRI, and their identification tag are sent out from respective radar systems. A plurality of codes is also made ready for each combination of the frequency hopping band and the PRI. The plurality of codes is also provided with their order.

(2) The code monitor 22 determines magnitude correlations between an identification tag of its own radar and those of other radars. When the codes of other radar systems coincide with that of the radar system of its own, and also the identification tag of its own is greater than those of other radar systems, then the code of its own will be one rank higher than the current code; and when the identification tag of its own is smaller than those of other radar systems, the code of its own will be one rank lower than the current code.

This arrangement allows, when a code conflict is detected, another conflict to be prevented from occurring after a new code is re-allocated.

Embodiment 10

Figure 13:
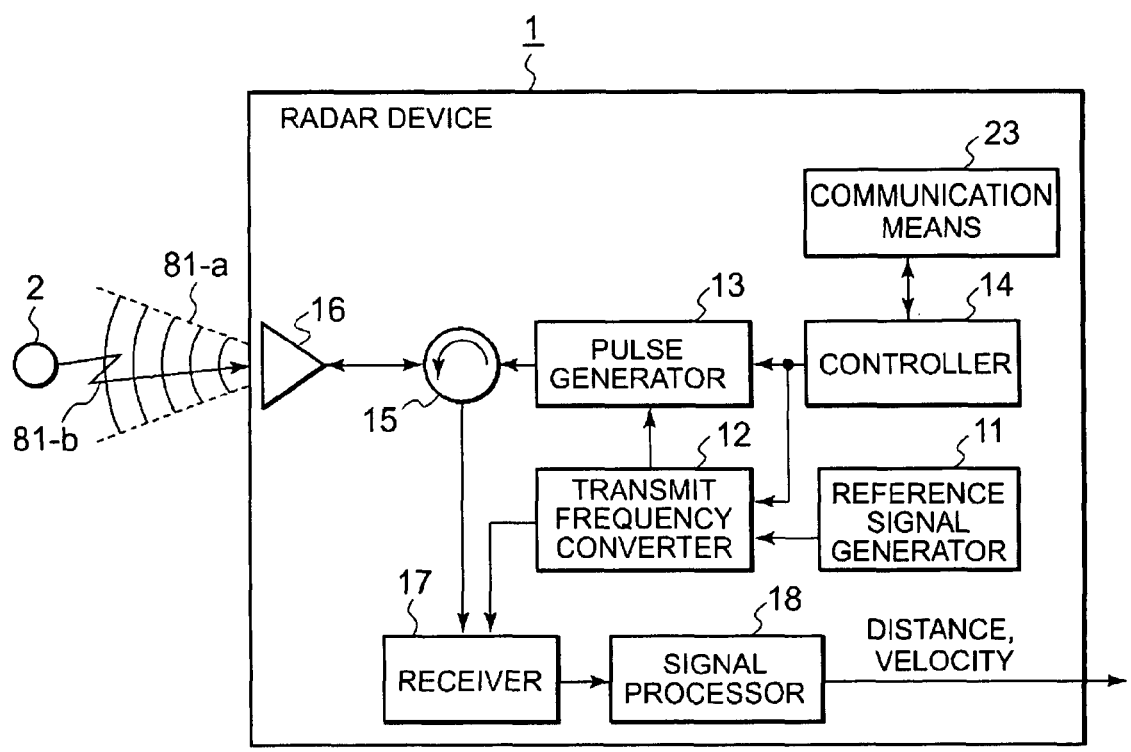
FIG. 13 is a block diagram illustrating a configuration of a radar system according to Embodiment 10 of the present invention.

Instead of detecting through radar waves conflicts of the PRI and the frequency hopping band, with its own information being exchanged for that of other radar systems through communication by a communication means, and on the basis of information obtained thereby, a PRI and a frequency hopping band each unique to a radar system may be selected. FIG. 13 is a block diagram showing a configuration of a radar system having such features. As shown in the figure, the radar system is provided with a communication means 23. The communication means 23 exchanges its own information for that of other radar systems. More specifically, the communication means 13 transmits to other radar systems the PRI and frequency hopping band information on the radar system of its own. The communication means 13 also receives from the respective radar systems their PRIs and frequency hopping bands information that are currently used by the respective radar systems. Based upon the surrounding circumstances, a PRI and a frequency band unique to the radar system of its own are selected.

With this configuration, it can be detected without using, for detecting interference waves, part of pulses and part of observation times, whether or not conflicts of the PRI and the frequency hopping band occur between other radar systems and the radar system of its own, so that observation accuracy can at any given time be maintained above a certain level.

Moreover, this result enables the receiver 17 and the signal processor 18 to simply be configured.

INDUSTRIAL APPLICABILITY

The present invention realizes that particularly, as is the case with a automotive radar, under circumstances where a plurality of continuous-wave radars coexist in a given zone, respective radar systems can stably observe external objects.

What is claimed is:

1. A radar system comprising:
    a reference signal generator configured to generate a continuous wave reference signal;
    a pulse generator configured to generate pulsed transmit signals by pulsing the continuous wave reference at an interval unique to the radar system;
    an antenna configured to emit the pulsed transmit signals into space as transmission radio waves;
    a receiver configured to acquire return signals by receiving the emitted radio waves reflected from an external object; and
    a signal processor configured to
        obtain a beat signal from the received signals and the continuous wave reference, and
        compute, from the obtained beat signal, a distance from and a velocity of the external object;
    where the pulse generator is further configured to change the unique interval after a predetermined time period.

2. A radar system as recited in claim 1, pulse generator further configured to determine the unique interval based on a random number.

3. A radar system as recited in claim 1, the reference signal generator further configured to generate frequency modulated continuous waves.

4. A radar system as recited in claim 1, the reference signal generator further configured to generate stepped-frequency continuous waves.

5. A radar system as recited in claim 1, the radar system further comprising:
    a multibeam-forming unit configured to form multiple beams for emission in a plurality of beam directions based on the continuous wave reference signal; and wherein
        the pulse generator is configured to select a transmission pulse repetition interval for each beam so that the combination of each beam direction and the transmission pulse repetition interval is unique to the radar system, and
        generate the pulsed transmit signals for each beam by pulsing, on a per-pulse repetition interval basis, the multiple beams' continuous transmission radio waves, and
    the antenna is configured to emit each beam's pulsed transmit signal in it's associated beam direction.

6. A radar system as recited in claim 1, further comprising an interference wave monitor configured to detect interference waves; and
    where the pulse generator is configured to select, as the unique interval, an interval differing from pulse repetition intervals detected interference waves.

7. A radar system as recited in claim 6, where the pulse is further configured to determine the unique interval based on a random number.

8. A radar system comprising:
    a reference signal generator configured to generate a continuous wave reference signal;
    a pulse generator configured to generate pulsed transmit signals by pulsing the continuous wave reference at an interval unique to the radar system;
    an antenna configured to emit the pulsed transmit signals into space as transmission radio waves;
    a receiver configured to acquire return signals by receiving the emitted radio waves reflected from an external object;
    a signal processor configured to
        obtain a beat signal from the received signals and the continuous wave reference, and
        compute, from the obtained beat signal, a distance from and a velocity of the external object;
    a code transmitter configured to generate codes from transmission pulse repetition intervals, and
        transmit the generated codes to other radar systems; and
    a code monitor configured to receive codes corresponding to transmission pulse repetition intervals that other radar systems use; and
    where the pulse generator is configured to select a transmission pulse repetition interval for the radar system based on received codes.

9. A radar system as recited in claim 8, wherein:
    the code transmitter is further configured to
        obtain the generated pulse transmit signals, and designate them as first pulse transmit signals,
        designate, as second pulse transmit signals pulse transmit signals obtained by pulsing the codes, and
        output the first and second pulse transmit signals on a time-division basis;
    the antenna further configured to emit, as the transmission radio waves, the outputted first and second pulse transmit signals,
        receive transmission radio waves reflected from external objects, and
        output the received signals; and
    the code monitor is further configured to extract codes from the antenna-output received signals, thereby obtaining codes corresponding to transmission pulse-repetition intervals that the other radar systems use.

10. A radar system as recited in claim 1, the radar system further comprising:
    a frequency modulator configured to modulate the frequency of the continuous wave reference; and
    a controller configured to control the pulse repetition interval of the pulse generator and frequency spectrum of the frequency modulator such that the combination of the pulse repetition interval and the spectrum of frequencies is unique to the radar system.

11. A method of operating a radar system, the method comprising:
    generating a frequency modulated continuous wave reference signal;
    generating pulsed transmit signals by pulsing the continuous wave reference at an interval unique to the radar system;
    emitting the pulsed transmit signals into space as transmission radio waves;
    acquiring return signals by receiving the emitted radio waves reflected from an external object;
    obtaining a beat signal from the received signals and the continuous wave reference,
    computing, from the obtained beat signal, a distance from and a velocity of the external object; and
    changing the unique interval after a predetermined time period.

12. A method of operating a radar system, the method comprising:
- generating a continuous wave reference signal;
- generating pulsed transmit signals by pulsing the continuous wave reference at an interval unique to the radar system;
- emitting the pulsed transmit signals into space as transmission radio waves;
- acquiring return signals by receiving the emitted radio waves reflected from an external object;
- obtaining a beat signal from the received signals and the continuous wave reference;
- computing, from the obtained beat signal, a distance from and a velocity of the external object;
- generating codes from transmission pulse repetition intervals;
- transmitting the generated codes to other radar systems;
- receiving codes corresponding to transmission pulse repetition intervals that other radar systems use; and
- selecting a transmission pulse repetition interval for the radar system based on received codes.

* * * * *